United States Patent
Remillard et al.

(10) Patent No.: US 6,897,435 B2
(45) Date of Patent: May 24, 2005

(54) ENCODER SELF-CALLIBRATION APPARATUS AND METHOD

(75) Inventors: Paul Remillard, Littleton, MA (US); Stuart Schechter, Newton, MA (US); Douglas A. Klingbeil, Niwot, CO (US)

(73) Assignee: GSI Lumonics Corporation, Northville, MI (US)

(*) Notice: Subject to any disclaimer, the term of this patent is extended or adjusted under 35 U.S.C. 154(b) by 315 days.

(21) Appl. No.: 10/284,608

(22) Filed: Oct. 31, 2002

(65) Prior Publication Data
US 2003/0112018 A1 Jun. 19, 2003

Related U.S. Application Data

(60) Provisional application No. 60/336,038, filed on Nov. 2, 2001.

(51) Int. Cl.$^7$ ................................................ G01D 5/34
(52) U.S. Cl. ................................. 250/231.13; 250/559.1
(58) Field of Search ......................... 250/231.13, 559.1, 250/231.16, 231.14, 237 G; 341/11, 13

(56) References Cited

U.S. PATENT DOCUMENTS

| | | | |
|---|---|---|---|
| 4,360,730 A | 11/1982 | Breslow | 250/231 |
| 4,575,581 A * | 3/1986 | Langberg | 178/18.02 |
| 4,772,872 A | 9/1988 | Villani | 341/9 |
| 4,873,655 A | 10/1989 | Kondraske | 364/553 |
| 5,138,564 A | 8/1992 | De Jong et al. | 364/571.04 |
| 5,241,173 A | 8/1993 | Howley et al. | 250/231.16 |
| 5,998,783 A | 12/1999 | Stridsberg | 250/231.13 |
| 6,029,363 A | 2/2000 | Masreliez et al. | 33/706 |
| 6,487,787 B1 | 12/2002 | Nahum et al. | 33/706 |

FOREIGN PATENT DOCUMENTS

EP 0 328 683 A1 8/1988

* cited by examiner

Primary Examiner—Que T. Le
(74) Attorney, Agent, or Firm—James F. Thompson, Esq.; Chapin & Huang, LLC

(57) ABSTRACT

The disclosed electronic processing apparatus calculates and applies calibrations to sensors that produce quasi-sinusoidal, quadrature signals. The apparatus includes either or both of fixed and programmable electronic circuits. The apparatus includes a circuit to calculate the phase and magnitude corresponding to the two input (quadrature) signals. The apparatus also includes a circuit for accumulating the number of cycles of the input signals. The apparatus also includes a circuit to generate Gain, Offset, and Phase calibration coefficients, wherein the circuit compares the phase space position of the measured phasor with the position of an idealized phasor, the locus of the idealized phasor in phase space being a circle of predetermined radius with no offset. The calculation of the coefficients occurs without user intervention, according to a pre-programmed rule or rules. The apparatus also includes a circuit to apply the Gain, Offset, and Phase calibration coefficients to the measured quadrature signals $x_i$ and $y_i$ according to the formulae $$X_i = (x_i + Ox_i + P_i \times y_i) \times Gx_i$$

$$Y_i = (y_i + Oy_i) \times Gy_i$$

where $Gx_i$ and $Gy_i$ are the scaling coefficients, $Ox_i$ and $Oy_i$ are the offset coefficients and $P_i$ is the phase coefficient and where $X_i$ and $Y_i$ are the post-calibration quadrature signals. The apparatus also includes a circuit that creates an output signal representative of the current, calibrated phase. The output signal is either a parallel, digital word or one or more serial pulse trains wherein the total number of pulses produced over time corresponds to the total phase change in the measured signal. The output signal is coded to allow phase decreases as well as phase increases.

8 Claims, 10 Drawing Sheets

| Step # | Inputs | State | Outputs |
|---|---|---|---|
| 705 | Power ON | Startup | "Power" LED on |
| 710 | $x_i$ and $y_i$ | Signal Check | R/Y/G "Signal" LED on |
| | | Operate | |
| 715 | $Z_w$ present | Index Ready | Blink "Signal" LED off |
| 720 | Calibrate command | Index Acquire | Start "Power" LED Flash |
| 725 | Index logic state | Acquiring Index | Blink "Signal" LED |
| 730 | | Index Window Calculate | |
| 735 | | Test Index Window | |
| 740 | | Calculate Index Phase | |
| 750 | Index calculated | Operate | Stop "Power" LED Flash |

FIG. 10

ENCODER SELF-CALLIBRATION APPARATUS AND METHOD

CROSS-REFERENCE SECTION

This application claims priority of provisional application 60/336,038 filed Nov. 2, 2001.

BACKGROUND OF THE INVENTION

As encoders have become more and more sophisticated and high precision, their setup and alignment has become more and more critical. Some encoders are completely sealed units and are thusly aligned and calibrated at the factory under ideal conditions. On the other hand, many other encoders, such as those sold by the assignee of the present invention, are delivered to customers as components or subsystems. There are several benefits of to this approach, however it does preclude full factory setup/alignment. Therefore, various means have been developed to aid customers during the installation and setup of this class of encoder.

Typical early attempts at helping customers set up these encoders comprised not much more than providing a set of test points in the electronics and a systematic written procedure to follow. More recently, various sensing circuits have been included in the encoder electronics that provide some indication of proper alignment and/or inform the user about calibration adjustments.

The prior art alignment aids do not provide any automatic calibration features. At best they seem to give a general indication of signal strength (i.e., is the electrical sinusoid too weak or too strong). For optimal operation, the relative phase between the quadrature signals should be as close to 90 degrees as possible, their relative gains should be equalized, and their individual offsets should be set to zero. To the extent possible, these calibration operations should be transparent to the user (that is, not require the user to make fine electrical adjustments).

In addition to these calibrations, modern encoders also have index (or reference) marks. The output index pulses should occur every time the scale is in the same position relative to the encoder head. Thus another problem addressed by this invention is the need to calibrate the index pulse generation system such that the index pulse is generated at the same scale location to within an LSB of the encoder measurement.

SUMMARY OF THE INVENTION

Circuitry and firmware logic built into the processing unit allow a user to quickly setup an encoder by simply running the encoder scale under the head a few times. Indicator lights on the connector notify the user of processor and encoder status.

During the self-calibration cycle the encoder processor can automatically adjust itself in terms of amplifier gain and offset and signal quadrature phase shift. Also, the disclosed method automatically places the index pulse near the center of the index window with a 1 LSB repeatability with respect to the "zero-location" fringe. Also, the disclosed apparatus communicates its status to the user with a simple LED display so all of these operations are performed without external test or monitoring equipment.

In one aspect, the invention provides a method of calibrating an optical encoder of the type that generates two analog quadrature signals, x, y. The method includes a step of generating a plurality of digital samples, $x_i$, $y_i$, of the analog signals x, y, i having integer values from one to an integer n larger than one. The method also includes generating a plurality calibrated samples $X_i$, $Y_i$, according to the equation $$X_i = (x_i + Ox_i + P_i \times y_i) \times Gx_i$$

$$Y_i = (y_i + Oy_i) \times Gy_i$$

$Gx_i$ and $Gy_i$ being scaling coefficients, $Ox_i$ and $Oy_i$ being offset coefficients, and $P_i$ being phase coefficients. The method also includes generating a plurality of magnitude $M_i$, and phase, $\Phi_i$, samples according to the equations $$M_i = \sqrt{X_i^2 + Y_i^2}$$

$$\Phi_i = ATAN\left[\frac{Y_i}{X_i}\right],$$

and $M_i$ and $\Phi_i$ defining one sample of a phasor $V_i$, according to the equation $$V_i = M_i \exp(j\Phi_i),$$

j being the complex number square root of negative one. The phasor $V_i$ may be represented by a line segment in a two-dimensional coordinate system. The phasor has a first end and a second end. The first end lies at the origin of the coordinate system. The second end is displaced from the first end by a length equal to the magnitude $M_i$, in a direction defined by an angle relative to the x axis equal to the phase $\Phi_i$. The method also includes providing initial values for the scaling coefficients, $Gx_1$ and $Gy_1$, the offset coefficients, $Ox_1$ and $Oy_1$, and the phase coefficients, $P_1$. The method also includes adjusting the values of the scaling coefficients, the offset coefficients, and the phase coefficients so that $Gx_{i+1}$ equals either $Gx_i$ or $Gx_i$ plus or minus an incremental adjustment, $Gy_{i+1}$ equals either $Gy_i$ or $Gy_i$ plus or minus an incremental adjustment, $Ox_{i+1}$ equals either $Ox_i$ or $Ox_i$ plus or minus an incremental adjustment, $Oy_{i+1}$ equals either $Oy_i$ or $Oy_i$ plus or minus an incremental adjustment, and $P_{i+1}$ equals either $P_i$ or $P_i$ plus or minus an incremental adjustment.

The incremental adjustments to the coefficients are made so as to move the second end of the phasor closer to a circle of predetermined radius (such as a unit circle) centered about the origin of the coordinate system. More specifically, the incremental adjustments to the coefficients may be made so that a distance between the second end of a hypothetical phasor $V'_i$ and the unit circle is less than or equal to a distance between a second end of the phasor $V_i$ and the circle. The hypothetical phasor $V'_i$ is determined by the following equations:

$$X'_i = (x_i + Ox_{i+1} + P_{i+1} \times y_i) \times Gx_{i+1}$$

$$Y'_i = (y_i + Oy_{i+1}) \times Gy_{i+1}$$

$$M'_i = \sqrt{X'^2_i + Y'^2_i}$$

$$\Phi'_i = ATAN\left[\frac{Y'_i}{X'_i}\right]$$

$$V'_i = M'_i \exp(j\Phi'_i)$$

In one alternative of the method, the coefficients $Gx_i$ and $Ox_i$, may be adjusted once while $V_i$ lies in one half of the circle, and may not be adjusted again until $V_k$ lies in the other half of the circle, k being greater than i. In another alternative, the coefficients $Gx_i$ and $Ox_i$, may be adjusted once while $V_i$ lies in the left half of the circle, and may not be adjusted again until $V_k$ lies in the right half of the circle, k being greater than i. In another alternative, the coefficients $Gy_i$ and $Oy_i$, may be adjusted once while $V_i$ lies in one half of the circle, and may not be adjusted again until $V_k$ lies in the other half of the circle, k being greater than i. In another alternative, the coefficients $Gy_i$ and $Oy_i$, may be adjusted once while $V_i$ lies in the upper half of the circle, and may not be adjusted again until $V_k$ lies in the lower half of the circle, k being greater than i. In another alternative, the coefficient $P_i$ may be adjusted once while $V_i$ lies in a quadrant of the circle, and may not be adjusted again until $V_k$ lies in a different quadrant of the circle, k being greater than i. Also, the values of the coefficients may be adjusted according to the following table:

modulo two pi, crosses from a fourth quadrant of a unit circle to a first quadrant of the unit circle. The count decreases by one every time the phase, when measured modulo two pi, crosses from the first quadrant of the unit circle to the fourth quadrant of the unit circle. The fourth quadrant extends from angles 3/2 pi to 2 pi. The first quadrant extends from angles zero to pi/2. The method also includes generating two burst output signals in A quad B format by: generating an integer number representative of the count and the phase $\Phi_i$; generating a running sum by counting transitions in the A quad B burst output signals, using known standard methods of counting transitions in A quad B format signals; generating a signed difference value representative of a difference between the integer number and the running sum; and generating transitions in the A quad B burst output signals until the signed difference value is zero.

In this method, the samples of phase $\Phi_i$ may be represented as binary numbers having Dmax bits, Dmax being a pre-determined integer. The integer number may be represented as a binary number having d bits, d being a pre-determined integer. The integer number has D least significant bits and d minus D most significant bits, D being a user selectable integer that is greater than zero, less than d, and less than Dmax. The integer number may be generated by setting the D least significant bits of the integer number equal to the D most significant bits of the phase $\Phi_i$, and by

| Angle (in degrees) From: | Angle (in degrees) To: | Space | Magnitude > unit circle radius | | | Magnitude < unit circle radius | | |
|---|---|---|---|---|---|---|---|---|
| | | | Gain/Offset | Offset | Phase | Gain | Offset | Phase |
| 348.75 | 11.25 | 0 | Gx = Gx − 1 | Ox = Ox − 1 | — | Gx = Gx + 1 | Ox = Ox + 1 | — |
| 11.25 | 33.75 | 1 | | | | | | |
| 33.75 | 56.25 | 2 | — | — | P = P − 1 | — | — | P = P + 1 |
| 56.25 | 78.75 | 3 | | | | | | |
| 78.75 | 101.25 | 4 | Gy = Gy − 1 | Oy = Oy − 1 | — | Gy = Gy + 1 | Oy = Oy + 1 | — |
| 101.25 | 123.75 | 5 | | | | | | |
| 123.75 | 146.25 | 6 | — | — | P = P + 1 | — | — | P = P − 1 |
| 146.25 | 168.75 | 7 | | | | | | |
| 168.75 | 191.25 | 8 | Gx = Gx − 1 | Ox = Ox + 1 | — | Gx = Gx + 1 | Ox = Ox − 1 | — |
| 191.25 | 213.75 | 9 | | | | | | |
| 213.75 | 236.25 | 10 | — | — | P = P − 1 | — | — | P = P + 1 |
| 236.25 | 258.75 | 11 | | | | | | |
| 258.75 | 281.25 | 12 | Gy = Gy − 1 | Oy = Oy + 1 | — | Gy = Gy + 1 | Oy = Oy − 1 | — |
| 281.25 | 303.75 | 13 | | | | | | |
| 303.75 | 326.25 | 14 | — | — | P = P + 1 | — | — | P = P − 1 |
| 326.25 | 348.75 | 15 | | | | | | | if Magnitude = unit circle radius then no coefficients are adjusted
wherein the increment value "1" is one least significant bit.

In another aspect, the invention provides method of processing signals generated by an optical encoder. The method includes generating samples of phase, $\Phi_i$, according to the equation $$\Phi_i = ATAN\left[\frac{Y_i}{X_i}\right],$$

where $X_i$ and $Y_i$ are samples of quadrature signals received from the encoder, and where i is an integer having values from one to an integer n.

The method also includes generating a count. The count increases by one every time the phase, when measured setting the d minus D most significant bits of the integer number equal to the d minus D least significant bits of the count. Alternatively, D may be the smallest integer satisfying the equation $D \geq Dmax + \log(S)/\log(2)$, where S is a user selectable scale factor. The method may include generating a scaled phase $\Theta_i$, equal to a product of the phase $\Phi_i$ and the user selectable scale factor S. The integer number may be generated by setting the D least significant bits of the integer number equal to the D least significant bits of the scaled phase $\Theta_i$, and by setting the d minus D most significant bits of the integer number equal to the d minus D least significant bits of the count.

In another aspect, the invention provides a method of generating an index signal for an optical encoder. The encoder generates quasi-sinusoidal quadrature signals indicative of a position of a scale relative to a sensor head. The encoder also generates a window signal. The window signal is characterized by a high value whenever an index mark of the scale is aligned with the sensor head. The window signal being characterized by a low value whenever the index mark is not aligned with the sensor head. The method includes setting a first number equal to the value of the phase when the window signal transitions from a low value to a high value; and setting a second number equal to the value of the phase when the window signal transitions from a high value to a low value. If a difference between the first number and the second number is greater than pi and less than 3 pi, then a phase index may be set equal to value that is between the first and second numbers. The method includes generating the index signal whenever the window signal is characterized by a high value and when the phase is substantially equal to the phase index. The phase index may be set equal to a median value between the first number and the second number. The steps of recording the phase values when at transitions of the window signal and of setting the phase index may be performed only after receipt of a calibration command. An indication to a user may be provided when the window signal is characterized by a high value. The indication to the user may be provided by activating a light source.

BRIEF DESCRIPTION OF THE FIGURES

FIG. 10 illustrates a method according to the invention by which the user interface logic communicates with the user.

DETAILED DESCRIPTION OF THE INVENTION

Figure 1:
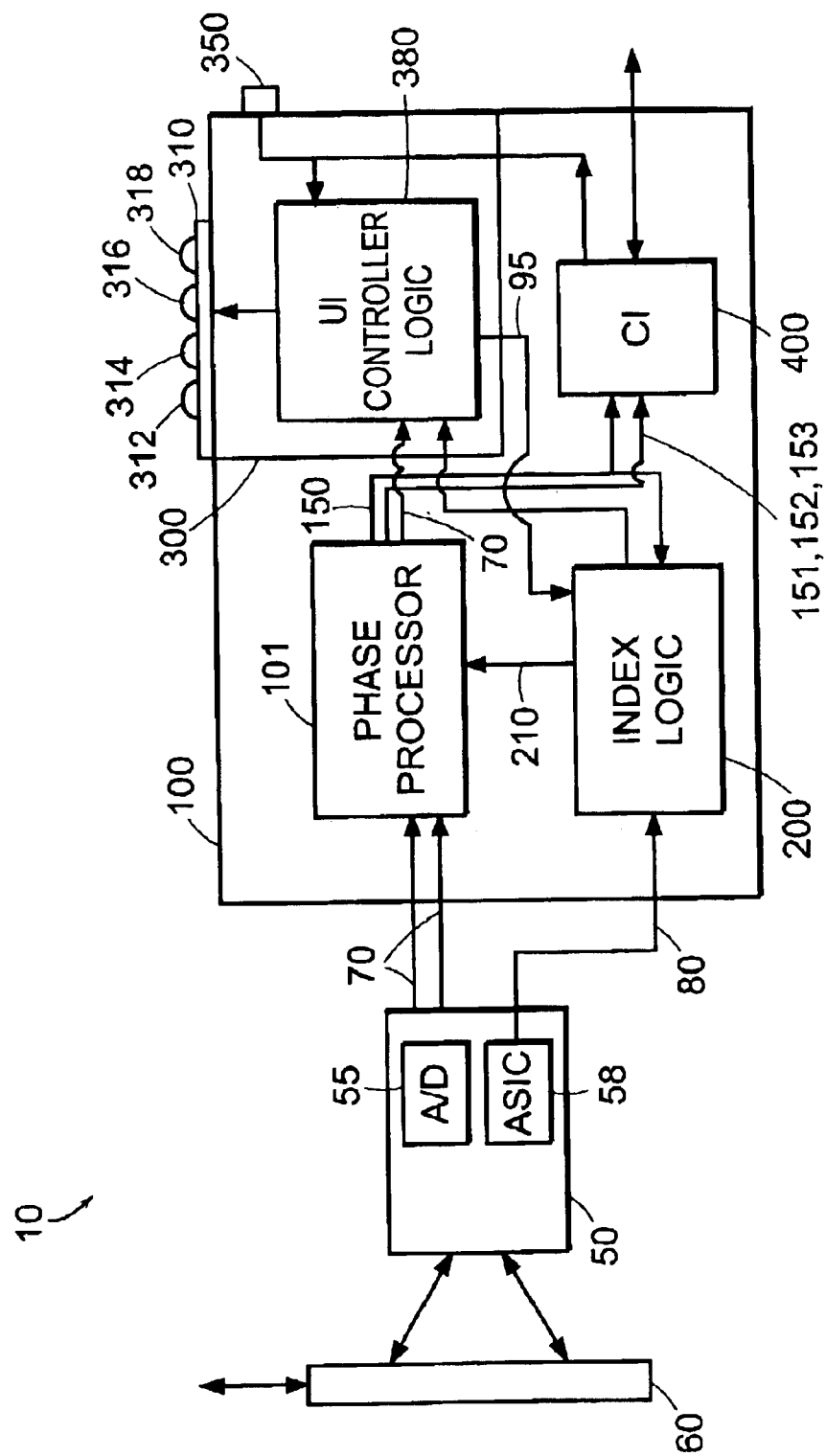
FIG. 1 shows a block diagram of encoder processing electronics constructed according to the invention.

FIG. 1 shows an optical encoder system 10 comprising a sensor head 50 that observes the relative motion of a scale 60 and associated signal processing electronics 100. As discussed below, the processing electronics 100 automatically calibrates the encoder's position measuring circuits and index pulse generating circuits. The electronics 100 are preferably implemented in a miniaturized form factor that includes firmware programmable logic, however, other implementations of the electronics 100 are embraced within the invention.

The Sensor Head

The sensor head 50 and scale 60 preferably cooperate in a known fashion to produce two families of signals. One family of signals provide information about the displacement of scale relative to the sensor head. These signals are the quadrature signals 70. The second family of signals is the index window signals 80; these signals indicate when a specific location on the scale 60 passes by the sensor head 50.

Figure 2:
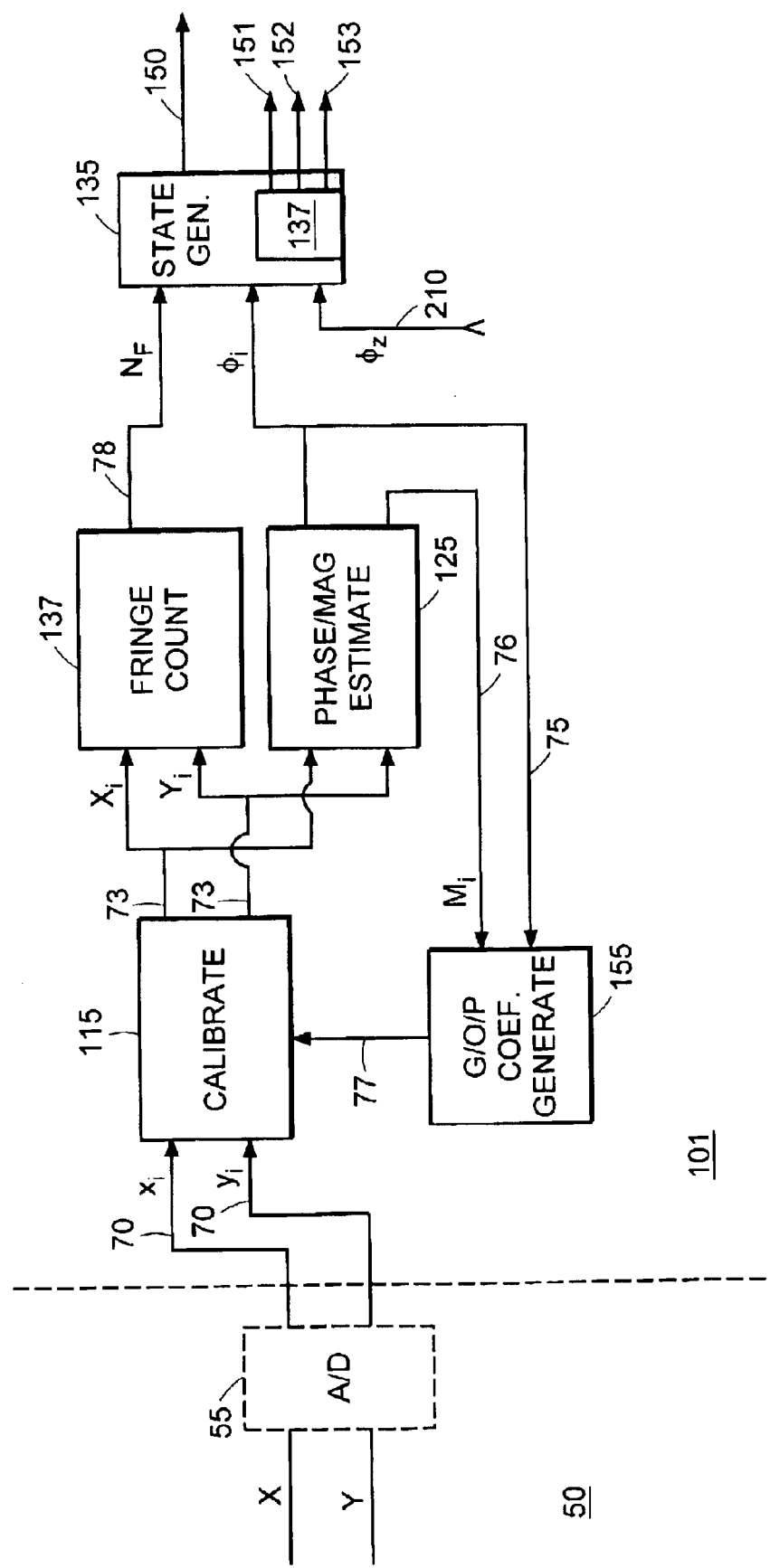
FIG. 2 shows a block diagram of the phase processor shown in FIG. 1.

In one preferred implementation the analog quadrature signals internal to the sensor head 50 have a generally sinusoidal strength variation that is related to the displacement of the scale 60. These "x" and "y" signals are ideally shifted from one another by 90 degrees of phase. These analog signals are typically sampled and converted to digital values in sensor head 50 by Analog-to-Digital converter 55; the digital output values 70 are denoted by "$x_i$" and "$y_i$," respectively in FIG. 2, where the subscripted "i" indicates that these values are sampled values. As shown in FIGS. 1 and 2, signals 70 are transmitted to phase processor 101 where their instantaneous phase, among other things, is determined. FIG. 2 shows a block diagram of the phase processor 101, the functional modules of which are described below.

Autonomous Calibration

The sampled values pass into calibration module 115 that applies Scaling ($Gx_i$ and $Gy_i$), Offset ($Ox_i$ and $Oy_i$), and Phase ($P_i$) calibration values using the formulae:

$$X_i = (x_i + Ox_i + P_i \times y_i) \times Gx_i$$

$$Y_i = (y_i + Oy_i) \times Gy_i \qquad (1)$$

where $X_i$ and $Y_i$ are the post-calibration quadrature signals 73. Similar formulae have been used in the prior art. These alternative formulae did not converge properly under all conditions and/or failed to accommodate the Phase calibration values. Formulae (1) are preferably combined with the incremental Coefficient Generator 155 discussed below to achieve proper convergence of the calibration values under all initial and subsequent conditions.

Collectively, the Scaling, Offset, and Phase calibration values arrive at circuitry 115 as Calibration Values 77 as shown in FIG. 2. In the preferred embodiment, the calibration circuitry 115 is implemented along with all other parts of the phase processor shown in FIG. 2 in a field programmable gate array (FPGA) using a firmware program stored in non-volatile memory (not illustrated) within the processing electronics 100. In the figure the various processing functions are shown as separated blocks for clarity only. Of course, a less integrated phase processor is also embraced within the invention.

Phase Estimator

Post-calibration quadrature signals 73 are processed in the phase estimator 125 to form estimates of the vector magnitude, $M_i$ 76, and phase, $\Phi_i$ 75, of a phasor that corresponds to the two quadrature signals. The magnitude and phase estimates may preferably be generated using so called CORDIC mathematics. CORDIC mathematics is known in the prior art but other processing approaches could also be used.

The phase estimator accepts the two post-calibration signals 73 and evaluates the magnitude and phase according to the formulae:

$$M_i = \sqrt{X_i^2 + Y_i^2}$$

$$\Phi_i = ATAN\left[\frac{Y_i}{X_i}\right]$$

These two processed values are distributed to several other modules within the processing electronics.

A sampled phasor corresponding to the magnitude and phase samples is defined by $V_i = M_i \exp(j\Phi_i)$, $V_i$ being the phasor, j being the complex number square root of negative one.

Coefficient Generator

Figure 3:
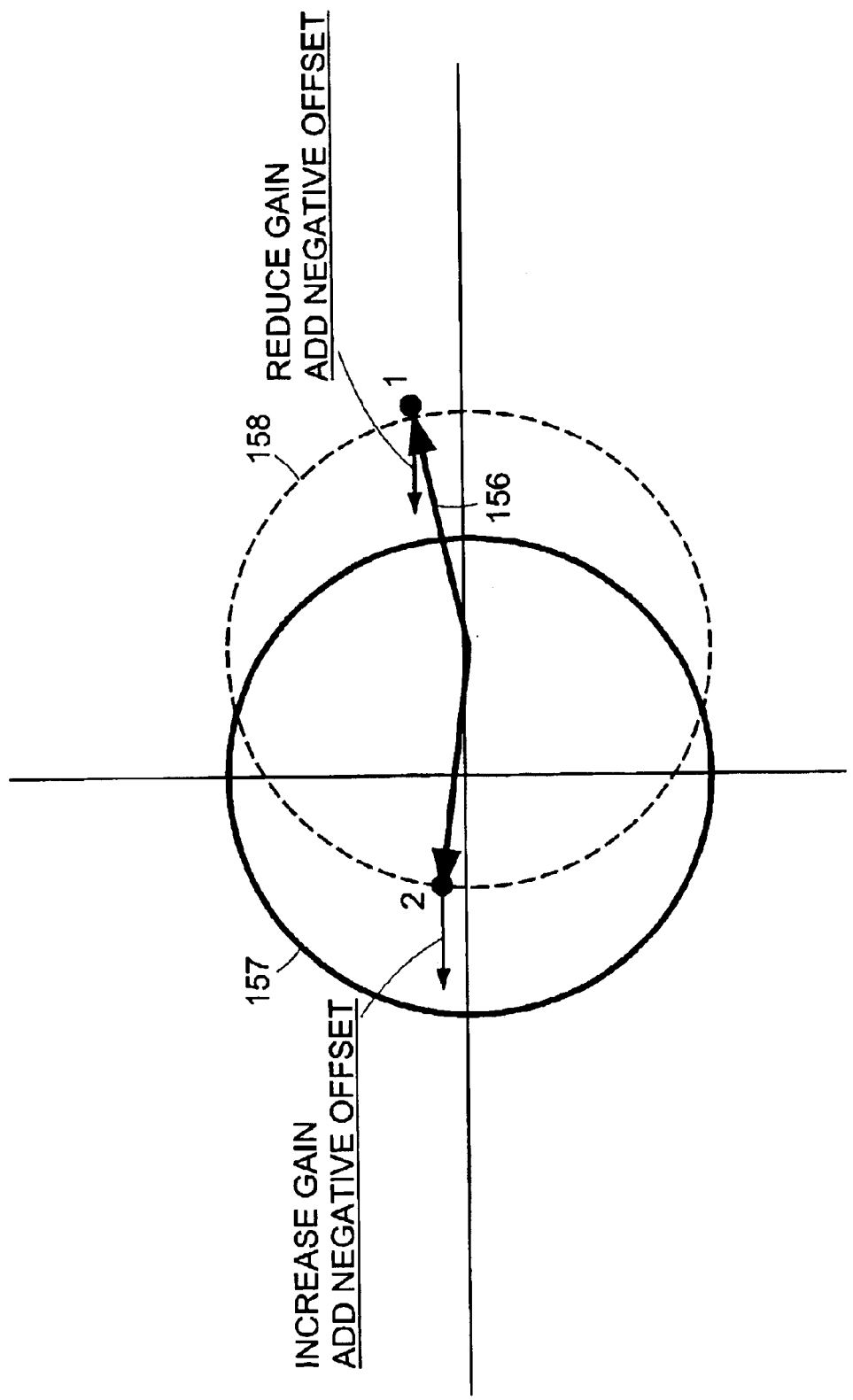
FIG. 3 illustrates calibration adjustments made according to the invention.

The Coefficient Generator functional module 155 uses the phase 75 and magnitude 76 values to adjust the calibration coefficients applied in the calibration module 115. As shown in FIG. 3 and Table 1 below, the Coefficient Generator module 155 applies a series of logical tests to decide if the phasor 156 represented by the phase 75 and magnitude 76 lies on a unit circle 157. If the phasor 156 is not on the circle 157, the module increments/decrements the various calibration coefficients 77 until the phasor does lie on that circle. Each increment/decrement is preferably small, so the effect of any one adjustment to the calibration coefficients is nearly imperceptible.

The logical tests can be applied with a variety of rules. For example, the coefficient generator module 155 may apply the tests each time a sample phase is recorded. Alternatively, in the preferred implementation, the tests are only applied if the current phase angle of the phasor is in a different quadrant than the phase value at which the last adjustment was made to the calibration coefficients. This preferred mode prevents the same correction from being applied over and over again when the scale is not moving across the sensor head. Another alternative is to calibrate the sensor once, to accommodate manufacturing and/or initial set up effects, and then to lock those calibration values in for all future measurements (or at least until a recalibration command is applied).

The application of these tests is illustrated in conjunction with FIG. 3, which shows an example of nearly pure positive x offset. FIG. 3 shows a unit circle 157. Ideally, the magnitude Mi generated by phase estimator 125 is always equal to one (on the scale of the diagram of FIG. 3), so the endpoint of the corresponding phasor always lies on the unit circle 157. However, calibration offsets can result in the phasors being displaced from the unit circle. FIG. 3 shows a case in which all generated phasors lie on the circle 158 which is displaced from the unit circle in the positive x direction. When the endpoint of the phasor generated by phase estimator 125 lies at point 1 (where the phase is about 10 degrees) the x value is too large (viz., outside the unit circle). In an attempt to move point 1 towards the unit circle, the module 155 reduces the gain, $Gx_i$, incrementally and makes the offset, $Ox_i$, slightly negative. At a later time, when the phase is noted to be about 180 degrees (point 2 in FIG. 3), the x value is too small (viz., inside the unit circle), so the module increases the gain incrementally and makes the offset a little more negative in an attempt to move point 2 out onto the unit circle. Module 155 preferably continues to adjust the calibration coefficients until such time as the phasor falls on the unit circle for all values of the phase. Note that in the example above the gain was alternately reduced and increased, netting to no change, while the offset was continually made more negative, properly correcting for the initial positive x offset.

Table 1 shows a preferred set of logical tests to be employed by module 155. As shown in the first line of the table, if the phase value of the current phasor is between 348.75 and 11.25 degrees, and if the magnitude of the current phasor is greater than unity, then module 155 decrements the calibration scale factors Gx and Ox by one least significant bit. Table 1 shows the preferred tests and adjustments performed by module 155 for all values of phase and magnitude of the current phasor, however, it will be appreciated that other sets of tests and adjustments may be used as well.

TABLE 1

Coefficient adjustment logic

| AngleFrom: | AngleTo: | Space | Mag > unitR | | | Mag < unitR | | |
| --- | --- | --- | --- | --- | --- | --- | --- | --- |
| | | | Gain / Offset | | Phase | Gain | Offset | Phase |
| 348.75 | 11.25 | 0 | Gx = Gx − 1  Ox = Ox − 1 | | — | Gx = Gx + 1 | Ox = Ox + 1 | — |
| 11.25 | 33.75 | 1 | | | | | | |
| 33.75 | 56.25 | 2 | — | — | P = P − 1 | — | — | P = P + 1 |
| 56.25 | 78.75 | 3 | | | | | | |
| 78.75 | 101.25 | 4 | Gy = Gy − 1  Oy = Oy + 1 | | — | Gy = Gy + 1 | Oy = Oy + 1 | — |
| 101.25 | 123.75 | 5 | | | | | | |
| 123.75 | 146.25 | 6 | — | — | P = P + 1 | — | — | P = P − 1 |
| 146.25 | 168.75 | 7 | | | | | | |
| 168.75 | 191.25 | 8 | Gx = Gx − 1  Ox = Ox + 1 | | — | Gx = Gx + 1 | Ox = Ox − 1 | — |
| 191.25 | 213.75 | 9 | | | | | | |
| 213.75 | 236.25 | 10 | — | — | P = P − 1 | — | — | P = P + 1 |
| 236.25 | 258.75 | 11 | | | | | | |
| 258.25 | 281.25 | 12 | Gy = Gy − 1  Oy = Oy + 1 | | — | Gy = Gy + 1 | Oy = Oy − 1 | — |

TABLE 1-continued

| | | | Coefficient adjustment logic | | | | |
| | | | Mag > unitR | | | Mag < unitR | |
| AngleFrom: | AngleTo: | Space | Offset | Phase | Gain | Offset | Phase |
| 281.25 | 303.75 | 13 | | | | | |
| 303.75 | 326.25 | 14 | — | — | P = P + 1 | — | — | P = P − 1 |
| 326.25 | 348.75 | 15 | | | | | |

Note: angles in degrees
note: if Mag = unitR then nothing is adjusted

Fringe Counter

The fringe counter module 137, shown in FIG. 2, identifies phase measurements in which a 2 pi boundary has been crossed. The sign bits from each set of calibrated quadrature signals 73 is sent to a fringe counter module 137. These sign bits are well know indicators of the quadrant of the unit circle in which a phasor resides. Thus, the module 137 increments or decrements the fringe count each time the phasor (represented by signals 73) transitions from the fourth to the first quadrant or back respectively. The output of fringe counter 137, the fringe count 78, provides the higher order bits in the output word 150, as described below.

Phase Output

The output signal from the phase processing electronics 101 can be either a digital word 150 (DW) or a pair of logic level pulse trains 151, 152, called A quad B (AQB) in the industry. This second format, shown in FIG. 7, comprises two phase-shifted pulse trains 151, 152 wherein each transition represents a phase change of one LSB. FIGS. 8A-G show how the pulse trains are related to the underlying scale position and to the quadrature signals generated by the encoder head. For clarity, the AQB signals are illustrated with no extra interpolation; that is, each of the AQB signals switches between high and low states once per cycle of the quadrature signals 70, allowing a position resolution of ¼—cycle.

FIG. 8A shows a hypothetical graph of scale motion, where the scale moves in one direction at a uniform velocity for a period of time, stops and waits, and then retraces its path. FIGS. 8B and 8E illustrate the quadrature signals 70. Note that these signals appear as true sinusoids only because the scale movement has constant velocity. FIGS. 8C and 8F illustrate the industry AQB standard A and B signals. Position is determined by counting the transitions in the AQB signals. Every transition between states represents a single count (or LSB) change. The direction of motion is determined by simple combinatorial logic rules that examine the before and after transition states of the two signals. Finally, FIGS. 8D and 8G illustrate the AQB burst signals 151, 152 as generated by the Burst Generator 137 of State Generator 135 of the present invention.

As shown in FIG. 2, the State Generator 135 generates these output signals by combining the phase 75 and the fringe count 78 to create a single digital word 150 representing the total unwrapped phase from some index location. The digital phase 75 forms the LSB's of the digital word 150 while the fringe count 78 forms the upper bits. Such a combination is well known in the art. The State Generator compares the new digital word 150 with the current AQB output state of Phase Processor 101 and controls the Burst Generator 137 to make the output state of burst signals 151, 152 represent the digital word 150.

Figure 9:
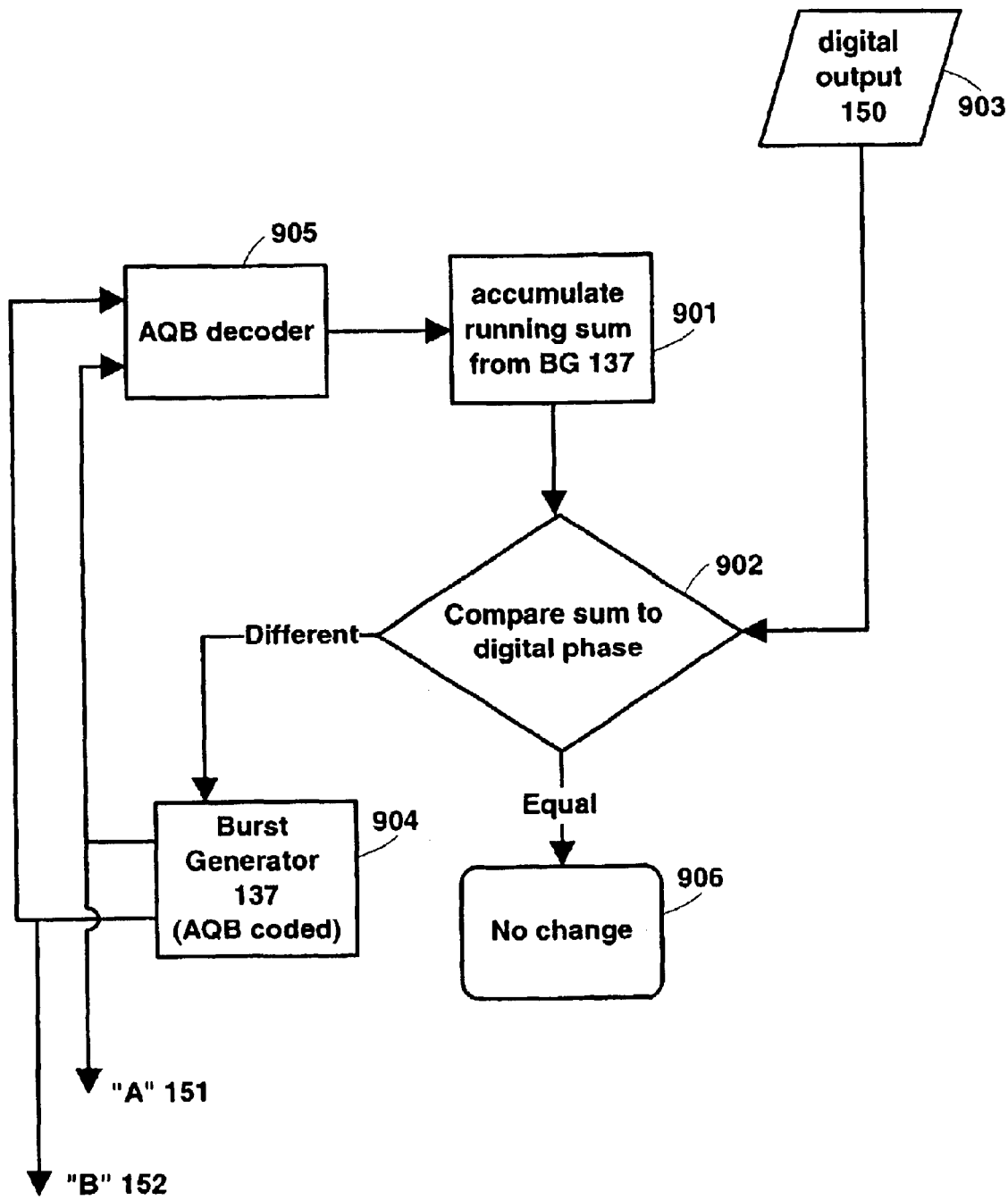
FIG. 9 shows a block diagram of a method for generating the signals shown in FIGS. 8D and 8G according to the invention.

FIG. 9 is a flow chart of the preferred implementation for generating AQB burst signals 151, 152 from the State Generator 135. State Generator 135 preferably contains an internal accumulator, Step 901 that maintains a running sum of transitions from Burst Generator 137. The running sum is compared at Step 902 to the current measured digital output word 150, Step 903. Based on this comparison, the State Generator controls the burst generator 137 to update the number of transmitted pulses in burst signals 150, 151. If the comparison shows the values to be equal, then, of course, no change is required (Step 906). On the other hand, if there is a difference, then Burst Generator 137 (Step 904) is commanded to produce a high speed string of transitions on the burst signal lines 151, 152. The burst generator correctly encodes the sequence of transitions using AQB encoding; that is, it recreates the correct phasing of the A and B signals such that standard AQB decoders will properly interpret increases or decreases in total count. The AQB signals are fed back to the accumulator through a decoding circuit, Step 905. When the running count in the accumulator equals the digital word 150, the comparison at Step 902 turns off the Burst Generator 137.

Figure 8:
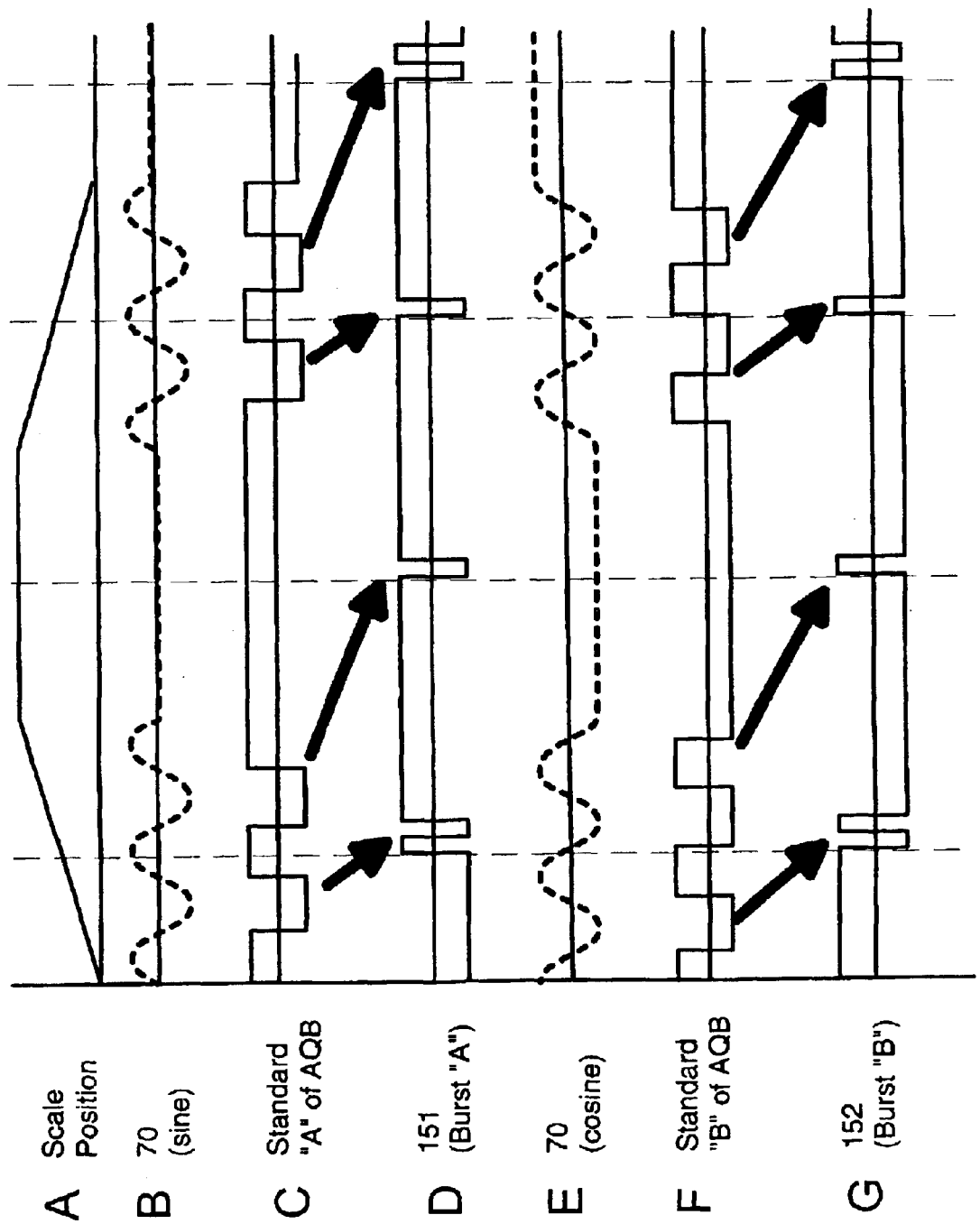
FIG. 8A illustrates motion of a scale in an encoder.
FIGS. 8B and 8E illustrate sine and cosine signals, respectively, generated by an encoder.
FIGS. 8C and 8F illustrate the A and B, respectively, portions of an A quad B signal generated by an encoder.
FIGS. 8D and 8G illustrate the A and B, respectively, of a burst A quad B signal generated according to the invention.

Returning to FIG. 8, the operation of the burst generator 137 is shown in FIGS. 8D and 8G for the A and B signals respectively. Each of the vertical dashed lines indicate a time at which a digital phase sample is taken. Whereas in the conventional AQB signals the transitions occur synchronously with the changing phase of the quadrature signals 70, in the burst signals 151, 152 all of the transitions occur immediately after the digital samples are taken. As indicated by the bold arrows, each transition in the conventional AQB signals has a corresponding transition in the burst signals, ensuring that the accumulated count is correct.

As illustrated in FIG. 8 and suggested in FIG. 9, the changes in the burst AQB output are initiated by the arrival of each new digital phase measurement 150. It is possible, however, for the burst generator to still be running when the next measurement arrives (for example, if there had been a very large position change in the previous digital sample). The aforementioned feedback loop ensures that even under this "overrun" condition the AQB output will be able to "catch up" to the measured position, since the burst generator keeps running until the comparison at Step 902 is satisfied.

Figure 7:
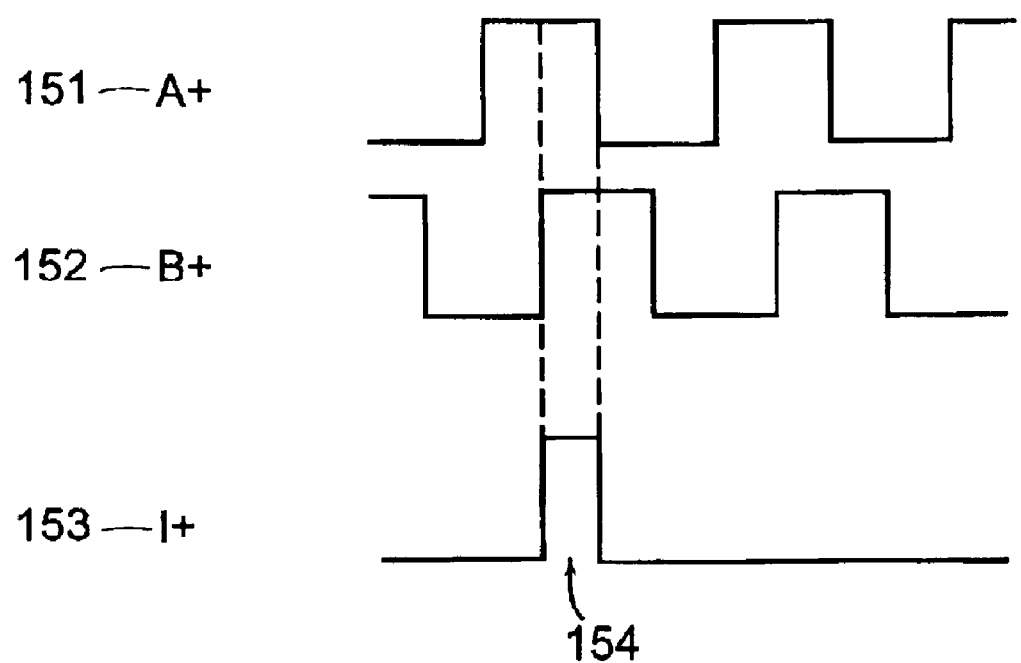
FIG. 7 illustrates A quad B signals and an index pulse.

The State Generator 135 also incorporates the index information in the output stream(s). As shown in FIGS. 1 and 2, the Index Logic 200 provides a single, digital Index Phase value 210 to the State Generator 135. In the A quad B output mode a separate index output line 153 is provided. The State Generator 135 raises the index output line 153 to logic "high" during the time when the measured phase exactly equals the index value. That is, as shown in FIG. 7, a one LSB long pulse 154 is transmitted during the burst of pulses that move the phase count from one side of the index to the other. Of course, the index output line 153 will remain high indefinitely if the scale happens to stop exactly on the index phase.

The State Generator can also accept a programming signal, not shown, which changes the apparent interpolation depth in the output 150. The change in interpolation depth is accomplished by simply scaling the full interpolation depth output of the phase estimator 125 by the desired integer interpolation factor. For example, if the phase estimator's inherent interpolation depth is 10 bits (×1024) and the programming signal commands an "×200" output, the state generator effectively applies a 200/1024 factor to each digital output phase (binary scaling factors such as ×8, or ×16 are typically applied by simple bit shifting). Since the burst generator produces AQB signals to match the digital word, the digital scale factor applied in the State Generator is automatically applied to the AQB output as well.

Although both the digital word output 150 and the AQB output are produced by the State Generator, typically, only one of the two phase output formats (DW or AQB) is actually transmitted to the user, depending on customer preference. When the State Generator 135 is generating the digital word type output, only binary interpolation scaling is preferably applied to avoid fractional bits. The number of bits of resolution is preferably logic programmable and is typically between 8 and 12 bits. In the DW embodiment, the preferred digital output word 150 is a 32 bit word, with the higher order bits being supplied by the fringe count 78. (Also in the preferred embodiment an additional 8 high order bits are provided to supply health and status information to make a 40 bit output word). In the preferred embodiment, this word is supplied to the user in bit-serial format.

In DW output mode the Index Phase value 210 can be used in at least three different ways. First, the fringe counter 137 can be set to zero every time the Index Phase is observed. Alternatively, the processor can be programmed to set the fringe counter to zero only at the first observation after power up. Thirdly, the State Generator can be programmed to internally subtract the Index Phase value from each and every measurement. In this latter configuration the digital output word 150 will read zero (0) whenever the index point is crossed. Alternatively, the Index Phase value 210 can be transmitted to the user to be used as he sees fit.

Index Pulse Set-up and Generation

Figure 4:
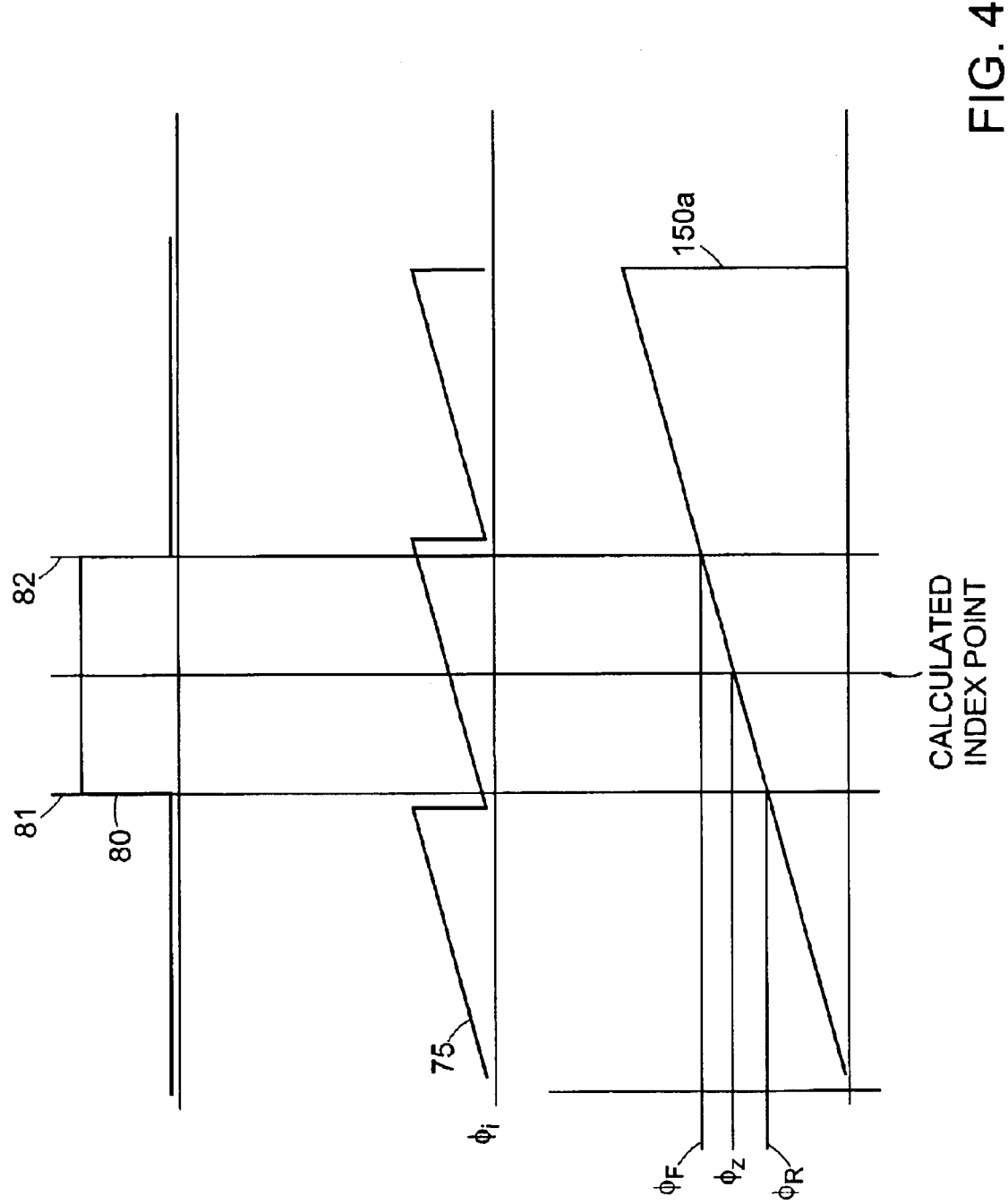
FIG. 4 illustrates calculation of an index point according to the invention.

As shown in FIG. 1, the second signal type produced by sensor head 50 is the index window signal 80. This signal, as shown in FIG. 4, is a logic level rectangular function that is preferably produced within the sensor head 50 itself by an ASIC 58. The window signal Zw is typically at logic level low for most positions of the scale 60 relative to the sensor head 50. However, when the index feature (not illustrated) on the scale reaches the sensor head, a special detector in the sensor head, combined with the internal ASIC, causes the Zw to rise to logic level high. If the scale continues to move past the sensor head, the index feature moves away from the sensor head and Zw returns to logic level low. As shown in FIG. 4, the index feature and the sensor head detector are designed such that, under typical alignment and operational conditions the distance that the scale travels between the rising edge 81 of Zw and the falling edge 82, is on the order of one optical fringe (i.e., the phase varies by approximately 360 degrees).

As indicated in FIG. 1, the index window signal 80, the phase value bits of output word 150 and a control signal 95 from the User Interface 300 are all applied as inputs to the Index Logic module 200. In the preferred mode, only the lowest bits of fringe counter 137 are used in the Index Logic module 200. In addition, in the preferred implementation, a portion of the processing of the Index Logic occurs in the aforementioned FPGA while other processing steps are performed by an included microprocessor chip. The control signal (which may also be supplied by an external computer through the computer interface 400) tells the module when to perform its function of developing and calibrating the index phase signal 210.

Generally, the physical index indicator on the scale 60 has only enough resolution to identify one particular fringe. Users, however, require that the index location be identified as a particular phase value, $\Phi_z$, that is repeatable to within a single LSB. The exact phase value (between 0 and 2 pi) is not important but the repeatability of the value is.

The index window 80 is always related to a particular grating location (viz., a particular fringe) but it does not always start at any particular phase value nor is it always exactly one fringe long. Therefore, index phase value, which must be repeatable to within one LSB, cannot be selected a priori because that a priori value (between 0 and 2 pi) might be outside the index window or might appear twice, at each end of a long index window. Preferably, then, as shown in FIG. 4, the index phase value should fall near the middle of the index window 80 to accommodate measurement to measurement variations in the locations of edges 81 and 82. Since there is no fixed relationship between the index window 80 and the measured phase 75 $\Phi_i$, a calibration function should be performed (a) to ensure the window is the correct size and (b) to determine a suitably centered value for the index phase value $\Phi_z$ 210. This digital phase value (210) is supplied to the State Generator 135 as shown in FIG. 2. In the preferred implementation, the index phase value 210 is calculated using a partially "unwrapped" digital phase 150a extracted from the lower order bits of the full digital output word 150. Typically, all of the phase processor bits and two fringe counter bits are used. As shown in FIG. 4, the measured phase 75 has discontinuities between 2 pi to 0, as is well understood. The digital output phase 150 eliminates these discontinuities by tracking the fringe count. For the purposes of calculating the index phase the index logic only needs to keep track of the fringe count over three or four fringes, as shown in FIG. 4, since the presence of the index window 80 gates the calculation to span at most three fringes.

Figure 5:
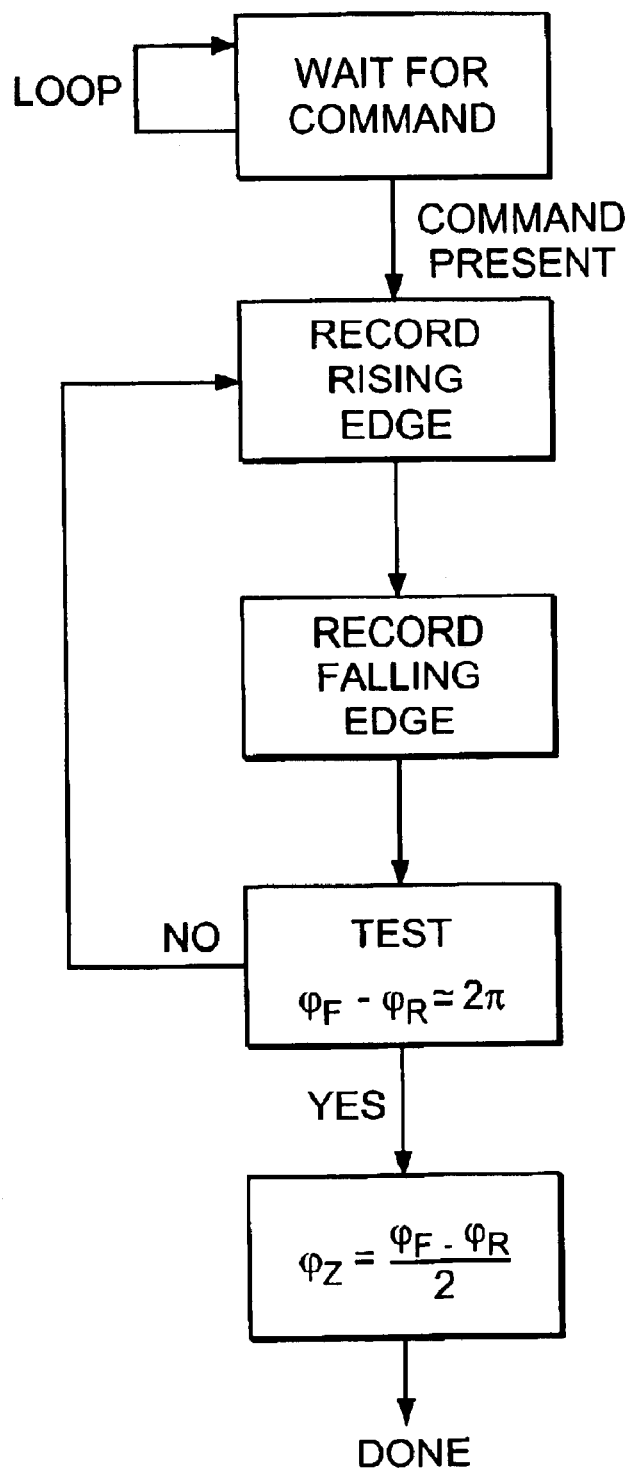
FIG. 5 shows a block diagram for calculating the index point according to the invention.

The index logic module 200 performs these calibration functions autonomously using a method similar to the typical method diagrammed in FIG. 5. As shown in the figure, the method typically includes the steps of:

1. Waiting until a "calibrate" command is present. <Step 501>
2. Monitoring the index window signal.
3. Recording the phase $\Phi_R$ for the rising edge 81. <Step 502>
4. Recording the phase $\Phi_F$ for the falling edge 82. <Step 503>
5. Subtracting $\Phi_R$ from $\Phi_F$ to estimate index window size. <Step 504>
6. Testing if index window is greater than 0.50 fringes and less than 1.50 fringes. [Return to step 2 if index window does not meet this criterion] <Step 504>
7. Setting the index phase 210 at the mid-point of the index window, viz. $\Phi_{Z=(\Phi_F-\Phi_R)}/2$. <Step 505>

Once the value of $\Phi_Z$ is set, the Index Logic 200 transmits the index phase 210 to the State Generator 135 in the Phase Processor 101, as shown in FIG. 1.

Note, of course, that the distinctions between various modules in the processing electronics 100 is made for clarity only; in the preferred implementation almost all of the processing electronics are part of a single FPGA or programmed into the included microprocessor.

Computer Interface

As shown in FIG. 1 the phase processing electronics 100 contain a computer interface module 400. In the context of this invention this module performs the typical input/output functions one skilled in the art would expect, providing the pathways and handshaking required to allow back and forth communications, data and control flow between the processing electronics 100 and an external computer.

User Interface

Figure 6A:
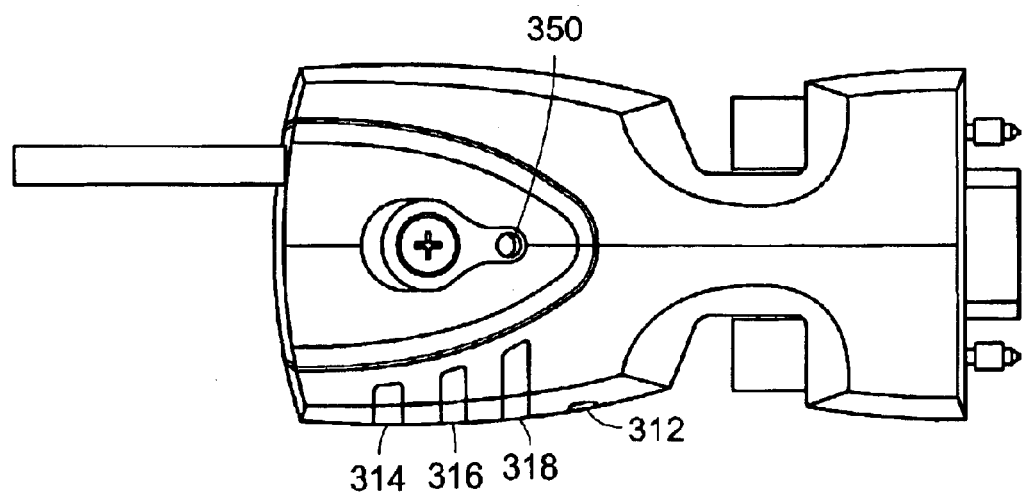
FIGS. 6A and 6B show top and side views, respectively, of connectors housing processing electronics constructed according to the invention.
Figure 6B:
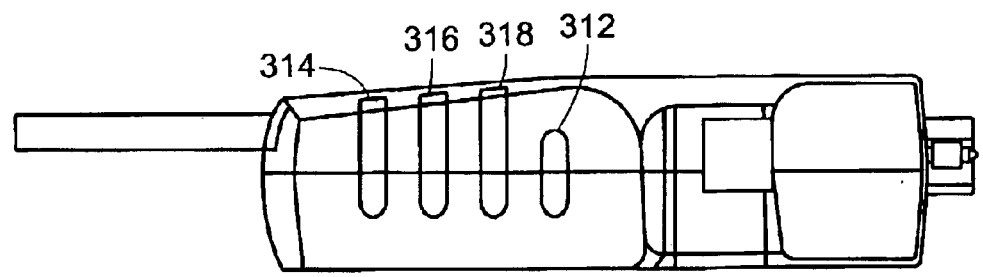

The last module illustrated in FIG. 1 is the diagnostic user interface 300. The preferred interface 300, shown in FIG. 6, comprises four light emitting diodes (LEDs) 312, 314, 316, 318 (shown collectively in FIG. 1 as 310), of different colors and/or sizes, and a user operated push button switch 350 all connected to controller logic 380. The logic 380 operates on the various signals produced by the phase processor 101 and the index logic 200 to control the LEDs 310 and it accepts the user's "index set-up" command in the form of a pressing of the push button switch 350.

FIG. 10 illustrates the method 700 by which the user interface logic 380 communicates with the user. At power up, step 705, the logic initializes itself and energizes the small, green Power LED 312. The logic then compares the two unprocessed quadrature signals 70 with each other. Stripped of their sign bits, these signals provide an estimate of the magnitude of the phasor. It is easy to show that when $|x_i|=|y_i|$, $|x_i|=M_i/1.414$, so the logic 380 uses the value $|x_i|$ when $|x_i|=|y_i|$ to select at step 710 the appropriate signal health indicator LED (314, 316, or 318). If the signal strength $M_i$ is above a previously defined "satisfactory" value, the green health indicator LED 314 is illuminated. If the signal strength is below the satisfactory value but above another previously defined "adequate" value the yellow health indicator LED 316 is illuminated. If the signal strength is below the adequate value, the red, warning, health indicator LED 318 is illuminated (this indicates for example that insufficient light is incident on the sensor head 50). Other indicator schemes could be used, as should be obvious to one of average skill in the art. Note that the "raw" signals 70 must be used, since all signals after the calibration module 115 will appear to have adequate magnitude, due to the action of the calibrator.

If at any time the user moves the index mark on the scale in front of the sensor head, step 715, the logic turns off the signal health LED (314, 316, or 318) for short period of time, say 10 seconds. This "blink" is the indication to the user that the index mark has been observed. Should the user want to set (or reset) the index phase calibration, the user can initiate the calibration mode by pressing the push button 350 on the user interface 300 or by sending the equivalent command though the computer interface 400. The user interface acknowledges the command, step 720, by placing the Power LED 312 into a flashing mode. This flashing mode will remain in effect until such time as the index calibration is completed or the unit is de-powered. Internally, the user interface 300 sends a calibrate command to the Index module 200

Once the unit is flashing, the user completes the calibration by moving the index point in front of the sensor head once again. Again, the user is informed that the index window has been observed when the UI logic 380 blinks the signal health LED (314, 316, or 318) off for a short period of time. The index logic 200 autonomously estimates the index phase, $\Phi_Z$, as was described above, in steps 725 through 740. When an index phase has been successfully calculated, the UI logic returns the Power LED 312 to its normal continuous mode, step 750. The user should move the index mark back and forth under the sensor head until the Power LED 312 returns to its normal continuous mode.

What is claimed is:

1. A method of calibrating an optical encoder, the encoder generating two analog quadrature signals, x, y, the method comprising:

a. generating a plurality of digital samples, $x_i$, $y_i$, of the analog signals x, y, i having integer values from one to an integer n larger than one;

b. generating a plurality calibrated samples $X_i$, $Y_i$, according to the equation $X_i=(x_i+Ox_i+P_i\times y_i)\times Gx_i$ $Y_i=(y_i+Oy_i)\times Gy_i$ $Gx_i$ and $Gy_i$ being scaling coefficients, $Ox_i$ and $Oy_i$ being offset coefficients, and $P_i$ being phase coefficients;

c. generating a plurality of magnitude $M_i$, and phase, $\Phi_i$, samples according to the equations $M_i=\sqrt{X_i^2+Y_i^2}$ $\Phi_i = ATAN\left[\frac{Y_i}{X_i}\right]$, $M_i$ and $\Phi_i$ defining one sample of a phasor $V_i$, according to the equation $V_i=M_i\exp(j\Phi_i)$, j being the complex number square root of negative one and where $V_i$ may be represented by a line segment having a first end and a second end, the first end lying at an origin of a two-dimensional coordinate system, the coordinate system defining an x axis and a y axis, the origin being located at an intersection of the x axis and the y axis, the second end being displaced from the first end by a length equal to the magnitude $M_i$, in a direction defined by a angle relative to the x axis equal to the phase $\Phi_i$;

d. providing initial values for the scaling coefficients, $Gx_1$ and $Gy_1$, the offset coefficients, $Ox_1$ and $Oy_1$, and the phase coefficients, $P_1$;

e. adjusting the values of the scaling coefficients, the offset coefficients, and the phase coefficients so that $Gx_{i+1}$ equals either $Gx_i$ or $Gx_i$ plus or minus an incremental adjustment, $Gy_{i+1}$ equals either $Gy_i$ or $Gy_i$ plus or minus an incremental adjustment, $Ox_{i+1}$ equals either $Ox_i$ or $Ox_i$ plus or minus an incremental adjustment, $Oy_{i+1}$ equals either $Oy_i$ or $Oy_i$ plus or minus an incremental adjustment, $P_{i+1}$ equals either $P_i$ or $P_i$ plus or minus an incremental adjustment;

the incremental adjustments being made so that a distance between the second end of a hypothetical phasor $V'_i$ and a circle is less than or equal to a distance between a second end of the phasor $V_i$ and the circle, the circle having a predetermined radius and being centered on the origin, the hypothetical phasor $V'_i$ being determined by the following equations:

$$X'_i = (x_i + Ox_{i+1} + P_{i+1} \times y_i) \times Gx_{i+1}$$

$$Y'_i = (y_i + Oy_{i+1}) \times Gy_{i+1}$$

$$M'_i = \sqrt{X'^2_i + Y'^2_i}$$

$$\Phi'_i = ATAN\left[\frac{Y'_i}{X'_i}\right]$$

$$V'_i = M'_i \exp(j\Phi'_i).$$

2. A method according to claim 1, wherein the coefficients $Gx_i$ and $Ox_i$, are adjusted once while $V_i$ lies in a half of the circle, and are not adjusted again until $V_k$ lies in the other half of the circle, k being greater than i.

3. A method according to claim 1, the circle including a left half and a right half, the left half being left of the origin, the right half being right of the origin, wherein the coefficients $Gx_i$ and $Ox_i$, are adjusted once while $V_i$ lies in the left half of the circle, and are not adjusted again until $V_k$ lies in the right half of the circle, k being greater than i.

4. A method according to claim 1, wherein the coefficients $Gy_i$ and $Oy_i$, are adjusted once while $V_i$ lies in a half of the circle, and are not adjusted again until $V_k$ lies in the other half of the circle, k being greater than i.

5. A method according to claim 1, the circle including an upper half and a lower half, the upper half being above the origin, the lower half being below the origin, wherein the coefficients $Gy_i$ and $Oy_i$, are adjusted once while $V_i$ lies in the upper half of the circle, and are not adjusted again until $V_k$ lies in the lower half of the circle, k being greater than i.

6. A method according to claim 1, wherein the coefficient $P_i$ is adjusted once while $V_i$ lies in a quadrant of the circle, and is not adjusted again until $V_k$ lies in a different quadrant of the circle, k being greater than i.

7. A method according to claim 1, wherein the circle is a unit circle.

8. A method according to claim 1, wherein the values of the coefficients are adjusted according to the following table:

| Angle (in degrees) From: | Angle (in degrees) To: | Space | Magnitude > unit circle radius | | | Magnitude < unit circle radius | | |
|---|---|---|---|---|---|---|---|---|
| | | | Gain | Offset | Phase | Gain | Offset | Phase |
| 348.75 | 11.25 | 0 | Gx = Gx − 1 | Ox = Ox − 1 | — | Gx = Gx + 1 | Ox = Ox + 1 | — |
| 11.25 | 33.75 | 1 | | | | | | |
| 33.75 | 56.25 | 2 | — | — | P = P − 1 | — | — | P = P + 1 |
| 56.25 | 78.75 | 3 | | | | | | |
| 78.75 | 101.25 | 4 | Gy = Gy − 1 | Oy = Oy − 1 | — | Gy = Gy + 1 | Oy = Oy + 1 | — |
| 101.25 | 123.75 | 5 | | | | | | |
| 123.75 | 146.25 | 6 | — | — | P = P + 1 | — | — | P = P − 1 |
| 146.25 | 168.75 | 7 | | | | | | |
| 168.75 | 191.25 | 8 | Gx = Gx − 1 | Ox = Ox + 1 | — | Gx = Gx + 1 | Ox = Ox − 1 | — |
| 191.25 | 213.75 | 9 | | | | | | |
| 213.75 | 236.25 | 10 | — | — | P = P − 1 | — | — | P = P + 1 |
| 236.25 | 258.75 | 11 | | | | | | |
| 258.75 | 281.25 | 12 | Gy = Gy − 1 | Oy = Oy + 1 | — | Gy = Gy + 1 | Oy = Oy − 1 | — |
| 281.25 | 303.75 | 13 | | | | | | |
| 303.75 | 326.25 | 14 | — | — | P = P + 1 | — | — | P = P − 1 |
| 326.25 | 348.75 | 15 | | | | | | | if Magnitude = unit circle radius then no coefficients are adjusted
wherein the increment value "1" is one least significant bit.

* * * * *